(12) United States Patent
Sohn et al.

(10) Patent No.: US 9,414,402 B2
(45) Date of Patent: Aug. 9, 2016

(54) METHOD OF COMMUNICATION BASED ON CONTROLLING RECEIVE CHAIN IN WIRELESS LOCAL AREA NETWORK AND APPARATUS FOR THE SAME

(75) Inventors: Ill Soo Sohn, Anyang-si (KR); Sunghyun Choi, Anyang-si (KR); Seungmin Yoo, Anyang-si (KR); Hyewon Lee, Anyang-si (KR); Munhwan Choi, Anyang-si (KR); Yong Ho Seok, Anyang-si (KR); Okhwan Lee, Anyang-si (KR)

(73) Assignees: LG ELECTRONICS INC., Seoul (KR); SNU R&DB FOUNDATION, Seoul (KR)

( * ) Notice: Subject to any disclaimer, the term of this patent is extended or adjusted under 35 U.S.C. 154(b) by 200 days.

(21) Appl. No.: 14/000,185

(22) PCT Filed: Feb. 9, 2012

(86) PCT No.: PCT/KR2012/000949
§ 371 (c)(1),
(2), (4) Date: Sep. 4, 2013

(87) PCT Pub. No.: WO2012/111939
PCT Pub. Date: Aug. 23, 2012

(65) Prior Publication Data
US 2013/0336306 A1 Dec. 19, 2013

Related U.S. Application Data

(60) Provisional application No. 61/444,143, filed on Feb. 18, 2011, provisional application No. 61/449,092, filed on Mar. 4, 2011, provisional application No. 61/449,703, filed on Mar. 6, 2011.

(51) Int. Cl.
*H04W 4/00* (2009.01)
*H04W 72/12* (2009.01)
*H04B 7/08* (2006.01)
*H04L 1/06* (2006.01)
*H04B 7/04* (2006.01)
*H04W 84/12* (2009.01)

(52) U.S. Cl.
CPC ......... *H04W 72/1263* (2013.01); *H04B 7/0452* (2013.01); *H04B 7/0877* (2013.01); *H04L 1/06* (2013.01); *H04W 84/12* (2013.01)

(58) Field of Classification Search
CPC ..................................................... H04B 7/0877
USPC ........................................................ 370/338
See application file for complete search history.

(56) References Cited

U.S. PATENT DOCUMENTS

| | | | |
|---|---|---|---|
| 8,451,760 B2* | 5/2013 | Vempati | H04W 52/0229 370/311 |
| 2004/0268206 A1* | 12/2004 | Kim et al. | 714/758 |
| 2005/0013352 A1* | 1/2005 | Hottinen | H04B 1/1027 375/219 |

(Continued)

*Primary Examiner* — Guang Li
(74) *Attorney, Agent, or Firm* — Lee, Hong, Degerman, Kang & Walmey; Jonathan Kang; Michael Monaco

(57) ABSTRACT

A method of communication based on a receive chain control, performed by a receiver, in a wireless local area network is provided. The method includes: receiving a frame from a transmitter, the frame indicating a multi receive chain operation, activating at least one receive chain, each receive chain processing a received signal transmitted through each spatial stream, and receiving at least one data field from the transmitter through the at least one activated receive chain.

6 Claims, 14 Drawing Sheets

(56) References Cited

U.S. PATENT DOCUMENTS

| | | | |
|---|---|---|---|
| 2006/0120476 A1* | 6/2006 | Li et al. | 375/267 |
| 2007/0014235 A1* | 1/2007 | Stephens | H04W 52/028 370/228 |
| 2010/0074190 A1* | 3/2010 | Cordeiro | H04W 48/16 370/329 |
| 2010/0091691 A1* | 4/2010 | Dorsey | H04B 1/036 370/311 |
| 2010/0284312 A1* | 11/2010 | Sampath et al. | 370/276 |
| 2011/0002219 A1* | 1/2011 | Kim et al. | 370/203 |
| 2012/0287815 A1* | 11/2012 | Attar | H04B 7/0871 370/253 |
| 2013/0250825 A1* | 9/2013 | Gosal | H04W 52/0232 370/311 |
| 2013/0336242 A1* | 12/2013 | Rajagopal et al. | 370/329 |

\* cited by examiner

METHOD OF COMMUNICATION BASED ON CONTROLLING RECEIVE CHAIN IN WIRELESS LOCAL AREA NETWORK AND APPARATUS FOR THE SAME

CROSS-REFERENCE TO RELATED APPLICATIONS

This application is the National Stage filing under 35 U.S.C. 371 of International Application No. PCT/KR2012/000949, filed on Feb. 9, 2012, which claims the benefit of U.S. Provisional Application Ser. No. 61/444,143, filed on Feb. 18, 2011, 61/449,092, filed on Mar. 4, 2011 and 61/449,703, filed on Mar. 6, 2011, the contents of which are all hereby incorporated by reference herein in their entirety.

TECHNICAL FIELD

The present invention relates to a wireless local area network (WLAN), and more particularly, to a communication method based on a receive chain control in a WLAN system and an apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

To effectively utilize a radio channel, the next-generation WLAN system supports multi user-multiple input multiple output (MU-MIMO) transmission in which a plurality of non-access point (AP) stations (STAs) concurrently access to a channel. According to the MU-MIMO transmission, an AP can transmit a frame concurrently to one or more MIMO-paired STAs.

When exchanging a frame according to the MU-MIMO transmission scheme, a receiver uses a plurality of spatial streams. Therefore, the receiver can use at least one activated receive chains. In a case where the receiver manages all of the plurality of receive chains to receive the frame, power consumption may be increased. For example, even in a case where the receiver can receive a frame by using a specific receive chain or when the receiver does not have to receive a frame which is intended to be transmitted to the receiver, unnecessary power consumption may occur when management is performed by using all of the receive chains. Accordingly, there is a need for a communication method based on a receive chain control when exchanging a frame between an AP and/or an STA.

SUMMARY OF INVENTION

Technical Problem

The present invention provides a communication method based on a receive chain control in a wireless local area network (WLAN) system and an apparatus supporting the method.

Technical Solution

In an aspect, a method of communication based on a receive chain control, performed by a receiver, in a wireless local area network is provided. The method includes: receiving a frame from a transmitter, the frame indicating a multi receive chain operation, activating at least one receive chain, each receive chain processing a received signal transmitted through each spatial stream, and receiving at least one data field from the transmitter through the at least one activated receive chain.

A frame may include a bit field indicating the multi receive chain operation.

The bit field may be included in a scrambling sequence of the frame.

The frame may be a request to send (RTS) frame.

The method may further include: receiving a signal field from the transmitter after the receiving the frame. The signal field may include a spatial stream indicator indicating a number of the at least one spatial stream allocated to the receiver.

The method may further include: controlling the at least one activated receive chains according to the number of the at least one spatial stream.

The step of the controlling the at least one activated receive chains may include: deactivating one or more activated receive chain among the at least one activated receive chains, if a number of the at least one activated receive chain exceeds the number of the at least one spatial stream.

The frame may include a group identifier indicating a transmission target receiver group and a spatial stream indicator indicating a number of at least one spatial stream allocated to the receiver.

The method may further include: determining whether to activate the at least one receive chain based on the group identifier and the spatial stream indicator.

Wherein if the receiver is a member of the transmission target receiver group and the number of at least one spatial stream is more than one, the activating the at least one receive chain may be performed.

A number of the at least one activated receive chain may be determined based on the number of at least one spatial stream.

In an another aspect, an wireless apparatus is provided. The wireless apparatus includes: a transceiver transmitting and receiving a radio signal and a processor operationally coupled to the transceiver. The processor is configured for the steps of: receiving a frame from a transmitter, the frame indicating a multi receive chain operation, activating at least one receive chain, each receive chain processing a received signal transmitted through each spatial stream and receiving at least one data field from the transmitter through the at least one activated receive chain.

Advantageous Effects

According to an embodiment of the present invention, an access point (AP) performs signaling to instruct a station (STA) that operates in a dynamic spatial stream (SM) power save mode to manage a plurality of receive chains based on MU-MIMO transmission and reception. Upon receiving signaling by the use of the AP, the STA activates the receive chain. The STA receives a group identifier and information indicating the number of spatial streams from the AP and thus can perform an operation for deactivating some receive chains according to an environment for multi-user-multiple input multiple output (MU-MIMO) transmission. Therefore, the STA can regulate a necessary receive chain according to a data reception environment. As a result, it is possible to prevent power consumption caused by activation of unnecessary receive chains.

In addition, since the AP instructs the management of the plurality of receive chains by using a frame and/or signal information defined in a protocol of the conventional WLAN system, an overhead caused by an additionally performed signaling process or additionally included information is not great, and mutual compatibility with the conventional WLAN system can be retained.

MODE FOR INVENTION

Figure 1:
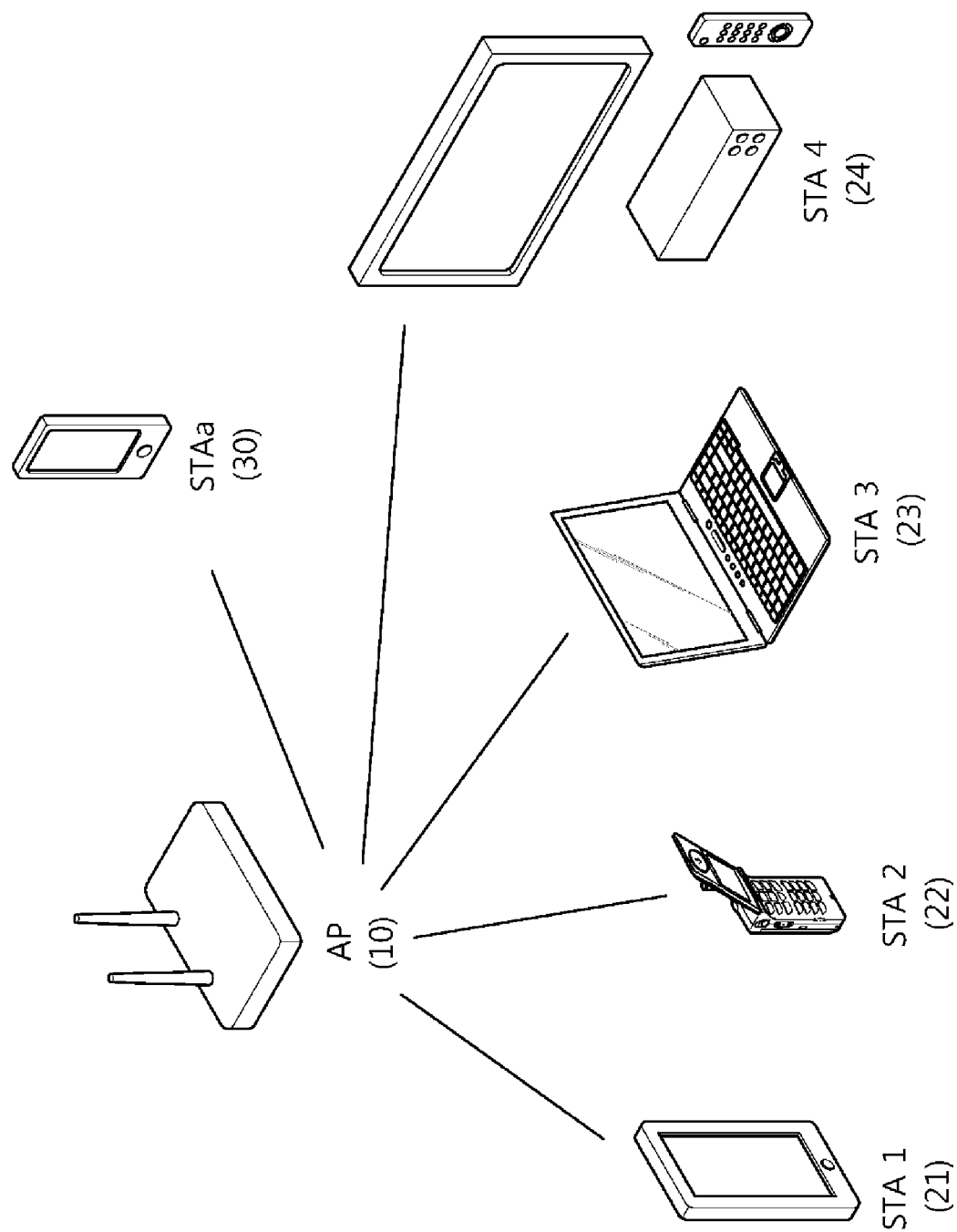
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

Figure 2:
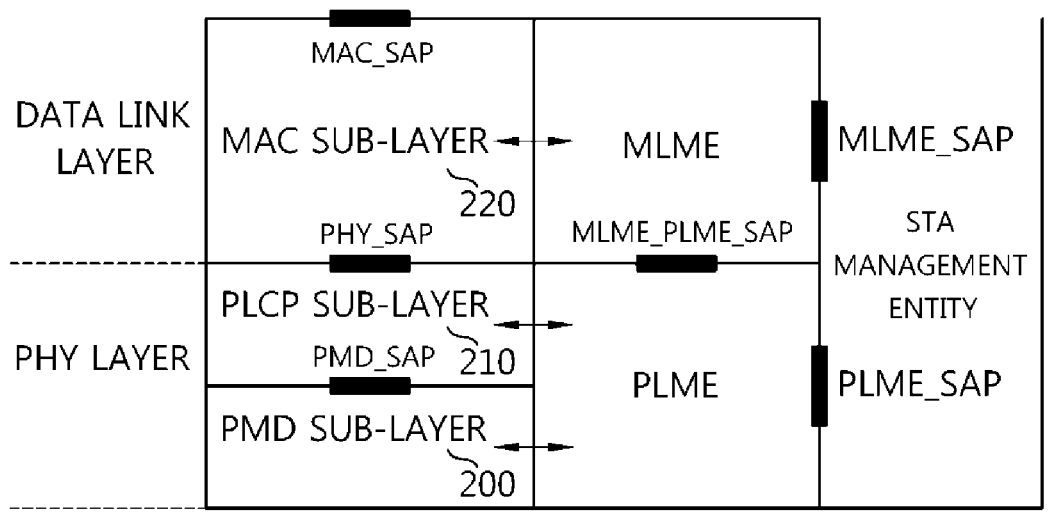
FIG. 2 shows a physical layer architecture of a WLAN system supported by IEEE 802.11.

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver to the PSDU in a process of receiving the PSDU from the MAC sub-layer 220 and delivering it to the PMD sub-layer 200. The additional field attached to the PSDU in this case may be a PLCP preamble, a PLCP header, tail bits required to reset an convolution encoder to a zero state, etc. The PLCP sub-layer 210 receives a TXVECTOR parameter delivered from the MAC sub-layer. The TXVECTOR parameter includes control information required to generate and transmit a PLCP protocol data unit (PPDU) and control information required by the reception STA to receive and interpret the PPDU. The PLCP sub-layer 210 uses information included in the TXVECTOR parameter when generating the PPDU including the PSDU.

The PLCP preamble serves to allow a receiver to prepare a synchronization function and antenna diversity before the PSDU is transmitted. The data field may include a coded bit sequence obtained by encoding a bit sequence including a PSDU to which padding bits, a service field including bit sequence for initializing a scrambler and tail bits are attached. In this case, either binary convolutional coding (BCC) encoding or low density parity check (LDPC) encoding can be selected as an encoding scheme according to an encoding scheme supported in an STA that receives the PPDU. The PLCP header includes a field that contains information on a PPDU to be transmitted, which will be described below in greater detail with reference to FIG. 3.

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data. The PLCP sub-layer of the reception STA delivers an RXVECTOR parameter including control information included in a PLCP preamble and a PLCP header to the MAC sub-layer so that the PPDU can be interpreted and data can be acquired in a reception state.

The WLAN system supports a transmission channel of more continuous 160 MHz and non-continuous 80+80 MHz bands to support a higher throughput. In addition, the WLAN system supports a multi user-multiple input multiple output (MU-MIMO) transmission scheme. An AP and/or an STA which intends to transmit data in the WLAN system supporting the MU-MIMO transmission scheme can transmit data packets simultaneously to at least one or more reception STAs which are MU-MIMO paired.

Referring back to FIG. 1, in the WLAN system as shown in the drawing, the AP 10 can simultaneously transmit data to an STA group including at least one STA among a plurality of STAs 21, 22, 23, 24, and 30 associated with the AP 10. Although it is shown in FIG. 1 that the AP performs MU-MIMO transmission to the STAs, in a WLAN system supporting a tunneled direct link setup (TDLS) or direct link setup (DLS) and a mesh network, an STA which intends to transmit data can transmit a PPDU to the plurality of STAs by using the MU-MIMO transmission scheme. Hereinafter, a case where the AP transmits the PPDU to the plurality of STAs according to the MU-MIMO transmission scheme will be described for example.

Data to be transmitted to each STA can be transmitted through a different spatial stream. A data packet to be transmitted by the AP 10 is a PPDU generated and transmitted in a physical layer of the WLAN system or a data field included in a PPDU, and can be referred to as a frame. That is, the data field included in the PPDU for SU-MIMO and/or MU-MIMO can be called a MIMO packet. It is assumed in the embodiment of the present invention that the STA1 21, the STA2 22, the STA3 23, and the STA4 24 belong to a transmission target STA group which is MU-MIMO paired with the AP 10. In this case, data may not be transmitted to a specific STA of the transmission target STA group since a spatial stream is not allocated thereto. Meanwhile, although the STAa 30 is associated with the AP, it is assumed that the STAa 30 is an STA not included in the transmission target STA group.

An identifier can be allocated to a transmission target STA group in order to support MU-MIMO transmission in the WLAN system, and such an identifier is called a group identifier (ID). The AP transmits a group ID management frame including group definition information for group ID allocation to STAs supporting MU-MIMO transmission. Accordingly, the group ID is allocated to STAs before PPDU transmission. A plurality of group IDs may be allocated to one STA.

Table 1 below shows an information element included in the group ID management frame.

TABLE 1

| order | information |
|---|---|
| 1 | category |
| 2 | VHT action |
| 3 | membership status |
| 4 | spatial stream position |

In the category field and the VHT action field, a frame corresponds to a management frame, and is configured to be able to identify a group ID management frame used in a next generation WLAN system supporting MU-MIMO.

As shown in Table 1, the group definition information includes membership status information indicating whether it belongs to a specific group ID, and if it belongs to the specific group ID, includes spatial stream location information indicating at which position a spatial stream set of a corresponding STA is located among all spatial streams based on MU-MIMO transmission.

Since one AP manages a plurality of group IDs, the membership status information provided to one STA needs to indicate whether an STA belongs to each group ID managed by the AP. Therefore, the membership status information can exist in an array format of sub-fields indicating whether it belongs to each group ID. Since the spatial stream location information indicates a location of a spatial stream set for each group ID, it can exist in an array format of sub-fields indicating a location of a spatial stream set occupied by an STA for each group ID. In addition, spatial stream information and membership status information for one group ID can be implemented in one sub-field.

When the AP transmits a PPDU to a plurality of STAs by using a MU-MIMO transmission scheme, the AP transmits the PPDU by inserting information indicating a group ID into the PPDU as control information. When the STA receives the PPDU, the STA confirms the group ID field and thus confirms whether the STA is a member STA of a transmission target STA group. If it is confirmed that the STA is the member of the transmission target STA group, the STA can determine at which position a spatial stream set to be transmitted to the STA is located among all spatial streams. Since the PPDU includes information indicating the number of spatial streams allocated to a reception STA, the STA can receive data by searching for spatial streams allocated to the STA.

Figure 3:
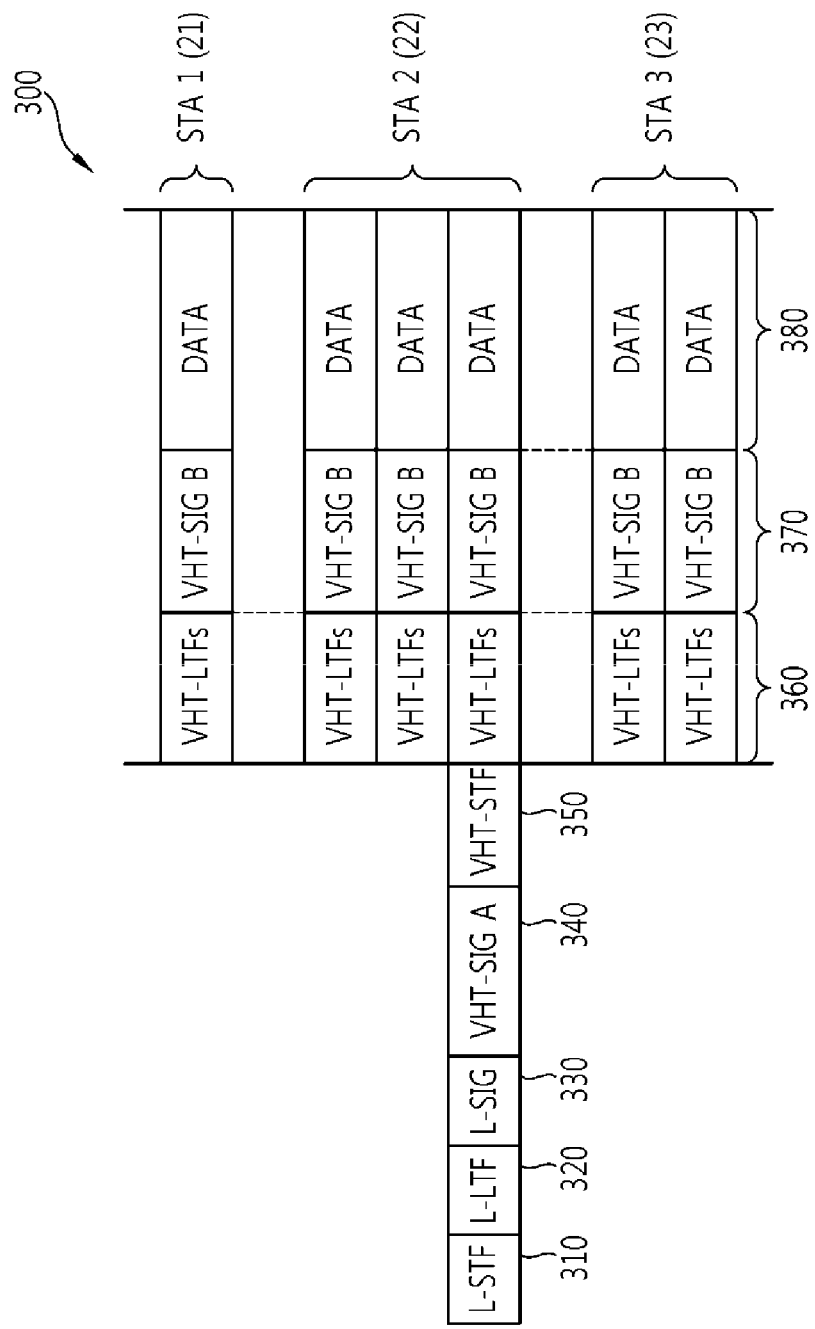
FIG. 3 shows an example of a PPDU format used in a WLAN system.

FIG. 3 shows an example of a PPDU format used in a WLAN system.

Referring to FIG. 3, a PPDU 300 includes an L-STF field 310, an L-LTF field 320, an L-SIG field 330, a VHT-SIGA field 340, a VHT-STF field 350, a VHT-LTF field 360, a VHT-SIGB field 370, and a data field 380.

A PLCP sub-layer constituting a PHY converts a PSDU delivered from a MAC layer into the data field 380 by appending necessary information to the PSDU, generates the PPDU 300 by appending several fields such as the L-STF field 310, the L-LTF field 320, the L-SIG field 330, the VHT-SIGA field 340, the VHT-STF field 350, the VHT-LTF field 360, the VHT-SIGB field 370, or the like, to the data field and delivers the PPDU 300 to one or more STAs through a physical medium dependent (PMD) sub-layer constituting the PHY. Control information required by the PLCP sub-layer to generate the PPDU and control information used by a reception STA to interpret the PPDU and transmitted by being included in the PPDU are provided from a TXVECTOR parameter delivered from the MAC layer.

The L-SFT 310 is used for frame timing acquisition, automatic gain control (AGC) convergence, coarse frequency acquisition, etc.

The L-LTF field 320 is used for channel estimation for demodulation of the L-SIG field 330 and the VHT-SIGA field 340.

The L-SIG field 330 is used when the L-STA receives the PPDU 300 and interprets it to acquire data. The L-SIG field 330 includes a rate sub-field, a length sub-field, a parity bit and tail field. The rate sub-field is set to a value indicating a bit state for data to be currently transmitted.

The length sub-field is set to a value indicating an octet length of a PSDU to be transmitted by the PHY layer at the request of the MAC layer. In this case, an L_LENGTH parameter which is a parameter related to information indicating the octet length of the PSDU is determined based on a TXTIME parameter which is a parameter related to a transmission time. TXTIME indicates a transmission time determined for PPDU transmission including the PSDU by the PHY layer in association with a transmission time requested for transmission of the PSDU. Therefore, since the L_LENGTH parameter is a time-related parameter, the length sub-field included in the L-SIG field 330 includes information related to the transmission time.

The VHT-SIGA field 340 includes control information (or signal information) required by STAs for receiving the PPDU to interpret the PPDU 300. The VHT-SIGA 340 is transmitted on two OFDM symbols. Accordingly, the VHT-SIGA field 340 can be divided into a VHT-SIGA1 field and a VHT-SIGA2 field. The VHT-SIGA1 field includes channel bandwidth information used for PPDU transmission, identifier information related to whether space time block coding (STBC) is used, information indicating either SU or MU-MIMO as a PPDU transmission scheme, and, if the transmission scheme is MU-MIMO, information indicating a transmission target STA group of a plurality of STAs which are MU-MIMO paired with the AP, and information regarding a spatial stream allocated to each STA included in the transmission target STA group. The VHT-SIGA2 field includes information related to a short guard interval (GI).

The information indicating the MIMO transmission scheme and the information indicating the transmission target STA group can be implemented as one piece of MIMO indication information, and for example, can be implemented as a group ID. The group ID can be set to a value having a specific range. A specific value in the range indicates an SU-MIMO transmission scheme, and other values can be used as an identifier for a corresponding transmission target STA group when the MU-MIMO transmission scheme is used to transmit the PPDU 300.

When the group ID indicates that the PPDU 300 is transmitted using the SU-MIMO transmission scheme, the VHT-SIGA2 field includes coding indication information indicating whether a coding scheme applied to the data field is binary convolution coding (BCC) or low density parity check (LDPC) coding and modulation coding scheme (MCS) information regarding a channel between a transmitter and a receiver. In addition, the VHT-SIGA2 field can include an AID of a transmission target STA of the PPDU and/or a partial AID including a part of bit-sequence of the AID.

When the group ID indicates that the PPDU 300 is transmitted using the MU-MIMO transmission scheme, the VHT-SIGA field 300 includes coding indication information indicating whether a coding scheme applied to the data field which is intended to be transmitted to MU-MIMO paired reception STAs is BCC or LDPC coding. In this case, MCS information for each reception STA can be included in the VHT-SIGB field 370.

The VHT-STF 350 is used to improve performance of AGC estimation in MIMO transmission.

The VHT-LTF 360 is used when the STA estimates a MIMO channel. Since the next generation WLAN system supports MU-MIMO, the VHT-LTF field 360 can be configured by the number of spatial streams in which the PPDU 300 is transmitted. In addition, when full channel sounding is supported and is performed, the number of VHT-LTFs may increase.

The VHT-SIGB field 370 includes dedicated control information required when the plurality of MIMO-paired STAs receive the PPDU 300 to acquire data. Therefore, the STA may be designed such that the VHT-SIGB field 370 is decoded only when the control information included in the VHT-SIGA field 340 indicates that the currently received PPDU 300 is transmitted using MU-MIMO transmission. On the contrary, the STA may be designed such that the VHT-SIGB field 370 is not decoded when the control information in the VHT-SIGA field 340 indicates that the currently received PPDU 300 is for a single STA (including SU-MIMO).

The VHT-SIGB field 370 includes MCS information and rate-matching information for each STA. Further, the VHT-SIGB field 370 includes information indicating a PSDU length included in the data field for each STA. The information indicating the PSDU length is information indicating a length of a bit-sequence of the PSDU and can be indicated in the unit of octet. A size of the VHT-SIGB field 370 may differ according to the MIMO transmission method (MU-MIMO or SU-MIMO) and a channel bandwidth used for PPDU transmission.

The data field 380 includes data intended to be transmitted to the STA. The data field 380 includes a service field for initializing a scrambler and a PLCP service data unit (PSDU) to which a MAC protocol data unit (MPDU) of a MAC layer is delivered, a tail field including a bit sequence required to reset a convolution encoder to a zero state, and padding bits for normalizing a length of the data field.

In the WLAN system of FIG. 1, if the AP 10 intends to transmit data to the STA1 21, the STA2 22, and the STA3 23, then a PPDU may be transmitted to an STA group including the STA1 21, the STA2 22, the STA3 23, and the STA4 24. In this case, as shown in FIG. 2, no spatial stream may be allocated to the STA4 24, and a specific number of spatial streams may be allocated to each of the STA1 21, the STA2 22, and the STA3 23 and thus data can be transmitted. In the example of FIG. 2, one spatial stream is allocated to the STA1 21, three spatial streams are allocated to the STA2 22, and two spatial streams are allocated to the STA3 23.

A plurality of spatial streams are used when exchanging a frame by using the MU-MIMO transmission scheme. Therefore, a reception STA can use at least one activated receive chain. The receive chain implies a physical entity for implementing essential signal processing for providing a received signal to a digital baseband. In MU-MIMO transmission, the receive chain is a physical entity for processing a signal related to a frame transmitted through a spatial stream. Therefore, in order to receive a PPDU which is MU-MIMO transmitted through a plurality of spatial streams, the reception STA must be operated by using a plurality of receive chains.

Although there is a receive chain which is not necessarily required for frame exchange, the STA can consume power on all activated receive chains. As a result, the STA may consume unnecessary power. For this, spatial multiplexing (SM) power saving can be proposed. The SM power saving allows the STA to operate a receive chain required for PPDU reception during a specific time period.

The STA can provide control regarding which receive chain is activated, and this can be implemented by using PHY-RXCONFIG.request primitive that specifies an ACTIVE_RXCHAIN_SET parameter which is a PHYCONFIG_VECTOR parameter. The ACTIVE_RXCHAIN_SET parameter may be a parameter that indicates which receive chain must be activated among a plurality of receive chains.

The SM power saving can be classified into a dynamic SM power save mode and a static SM power save mode. An STA that operates in the static power save mode allows one receive chain to remain in an active state.

In the dynamic power save mode, the STA activates a plurality of receive chains to receive a frame sequence when the frame sequence starts for the STA.

The frame sequence begins with transmission of one frame which is transmitted separately to one spatial stream. The frame requests an immediate response, and corresponds to a frame to be transmitted to an STA operating in the dynamic SM power save mode. Examples of the frame may include a request to send (RTS)/clear to send (CTS) sequence. That is, upon receiving the RTS frame, the STA can activate a plurality of receive chains.

The reception STA must be able to receive a PPDU to be transmitted by using an MCS indicating at least one spatial stream after a short interframe space (SIFS) elapses from a transmission end time of a response frame transmitted in response to a specific frame which is a start of the frame sequence.

The STA operating in the dynamic power save mode as described above can activate the plurality of receive chains upon receiving an RTS frame transmitted to the STA, and can return to an initial state at the end of the frame sequence. The reception STA may determine that the frame sequence is terminated when the reception STA receives a frame transmitted to another STA, the reception STA receives a frame including an address of a transmitter other than another address of another transmitter which transmit a frame which has already initiated transmission opportunity (TXOP), or when a CS mechanism indicates that a radio medium is in an idle state during a specific time period.

Meanwhile, the STA operating in the SM power save mode cannot distinguish an RTS/CTS sequence transmitted before MIMO transmission is achieved from another RTS/CTS sequence. Therefore, when the STA receives an RTS frame transmitted to the STA, the STA can allow the plurality of receive chains to be activated always.

An STA supporting an HT and/or a VHT can use an SM power save action frame to exchange an SM power save indication for indicating its SM power save state to another STA. Meanwhile, an STA not supporting the HT and the VHT can set and use an SM power save bit included in an HT capability information element of an association request frame in order to exchange the power save state to another STA. In the latter case, the STA may be allowed to be able to use only one receive chain immediately after being associated.

Upon establishing one or more DLSs, the STA must report the change of the SM power save mode to all STAs before operating in the changed SM power save mode.

Similarly to a reception confirmation response for a frame including the HT capability information element or a reception confirmation response of an SM power save frame, the number of activated receive chains can be changed after the SM power save mode indication is successfully delivered. The SM power save mode indication is transmitted through a frame transmitted separately.

If a reception STA does not use MU-MIMO in a WLAN system supporting MU-M) transmission, power consumption can be decreased by activating one receive chain and by deactivating the remaining receive chains. When the reception STA is operating in the static SM power save mode, one receive chain is persistently used. When the reception STA is operating in the dynamic power save mode, while using one receive chain usually, the reception STA can adaptively activate a receive chain if MU-MIMO transmission is necessary. In case of the dynamic SM power save mode, a further effective operation is possible when information indicating the number of spatial streams allocated to a specific STA is provided before MU-MIMO transmission. This can be implemented by providing a group ID and information indicating the number of spatial streams.

A communication method for supporting a reception STA operating in the SM power save mode such that it can receive a frame by adaptively using a receive chain may be different depending on a function supported by the reception STA. That is, the communication method can be implemented differently in a case where the reception STA can perform fast receive chain activation and in other cases.

Hereinafter, a communication method based on a receive chain control according to an embodiment of the present invention will be described with reference to the accompanying drawings. As a frame transmitted by a transmitter, a PPDU has the format of FIG. 3, and respective fields are sequentially transmitted. However, for convenience of explanation, it is assumed in the following embodiment that a VHT-SIGA field is transmitted through a single-spatial stream and subsequently a data field is transmitted through at least one spatial stream. The description does not exclude an example in which L-STF, L-LTF, and L-SIG fields are transmitted before transmission of the VHT-SIGA field and in which and VHT-STF, VHT-LTF, and VHT-SIGB fields are transmitted in the middle of transmission of the VHT-SIGA field and the data field.

Figure 4:
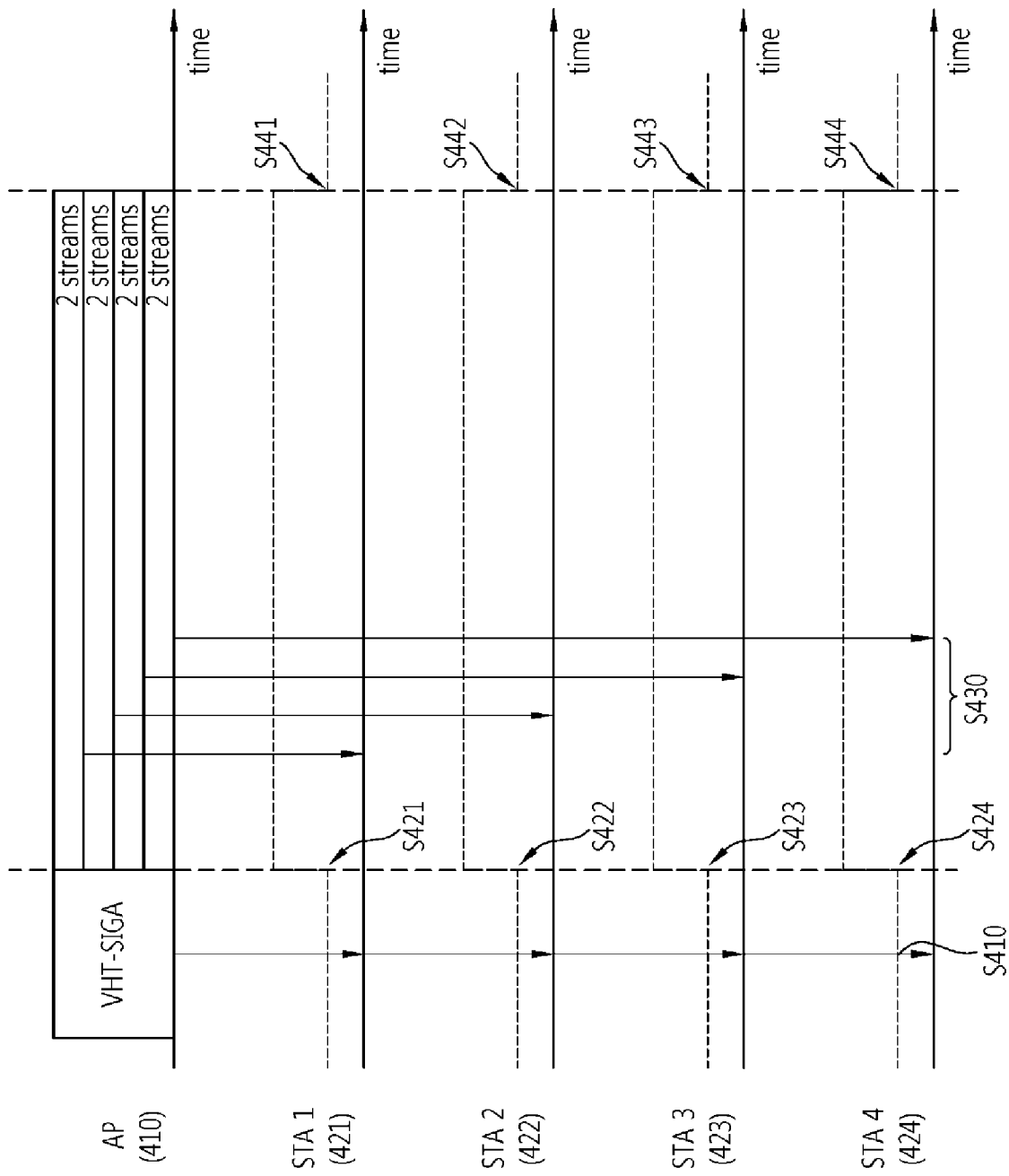
FIG. 4 shows a communication method based on a receive chain control through fast receive chain activation according to an embodiment of the present invention.

FIG. 4 shows a communication method based on a receive chain control through fast receive chain activation according to an embodiment of the present invention.

STA1 to STA4 421, 422, 423, and 424 are STAs supporting a fast receive chain activation function. The fast receive chain activation implies that a receive chain can be adaptively changed on the basis of control information included in PPDU reception.

Referring to FIG. 4, the STA1 to the STA4 421, 422, 423, and 424 are operating as a single receive chain, and receive a VHT-SIGA field through the single receive chain (step S410). As described above, the VHT-SIGA field includes a group ID indicating a transmission target STA group and information indicating the number of spatial streams allocated to respective transmission target STAs.

Each STA receives a VHT-SIGA field, and can know which spatial stream is allocated to the STA on the basis of the group ID and spatial stream indication information. Therefore, each STA can determine whether another receive chain needs to be activated in order to receive a data field through a spatial stream allocated to the STA, and if it needs to be activated, can determine an extent of activation.

Therefore, the STAs 421, 422, 423, and 424 change a receive chain after receiving the VHT-SIGA field (steps S421, S422, S423, and S424). In this case, each STA can activate all receive chains, and can activate only a necessary receive chain to receive the data field. However, in the example of FIG. 4, the STAs 421, 422, 423 and 424 activate only the necessary receive chain. Each STA operating as a single chain that uses one receive chain before receiving of the VHT-SIGA field activates one more receive chain so as to receive the data field through two spatial streams. It is assumed in the present invention that the spatial streams are allocated to each STA.

The STA1 421, the STA2 422, the STA3 423, and the STA4 424 receive data fields which are intended to be transmitted to the STAs through spatial streams allocated to the STAs (step S430).

Upon completion of receiving the data fields, the STAs 421, 422, 423, and 424 can deactivate some receive chains which are additionally activated, and thus can operate as a single receive chain (step S441 to S444).

Although not shown, each STA can remain in the existing operational state without having to change a receive chain if the STA is not included in a transmission target STA group indicated by a group ID or if the number of spatial streams allocated to the STA is 0. In addition, each STA can remain in the existing operational state if the STA is included in the transmission target STA group and one spatial stream is allocated thereto.

According to the example of FIG. 4, since an additional overhead such as an RTS/CRS sequence is not necessary to change a receive chain of the reception STA, the SM power save mode can be effectively supported for MU-MIMO transmission. Meanwhile, whether the fast reception receive chain activation function is allowed to each STA can be controlled by the AP, and this can be implemented in such a manner that transmission is performed by including information indicating whether to admit a corresponding function to capability control information.

Meanwhile, regarding an STA not supporting the fast receive chain activation, additional signaling is necessary so that the STA can change the receive chain. This is because, although the STA can know that a PPDU will be transmitted to the STA through the VHT-SIGA field according to MU-MIMO transmission, other receive chains may not be activated during a time in which the data field is transmitted after transmission of the VHT-SIGA field. Hereinafter, a communication method based on a receive chain control for an STA not supporting fast receive chain activation will be described.

Figure 5:
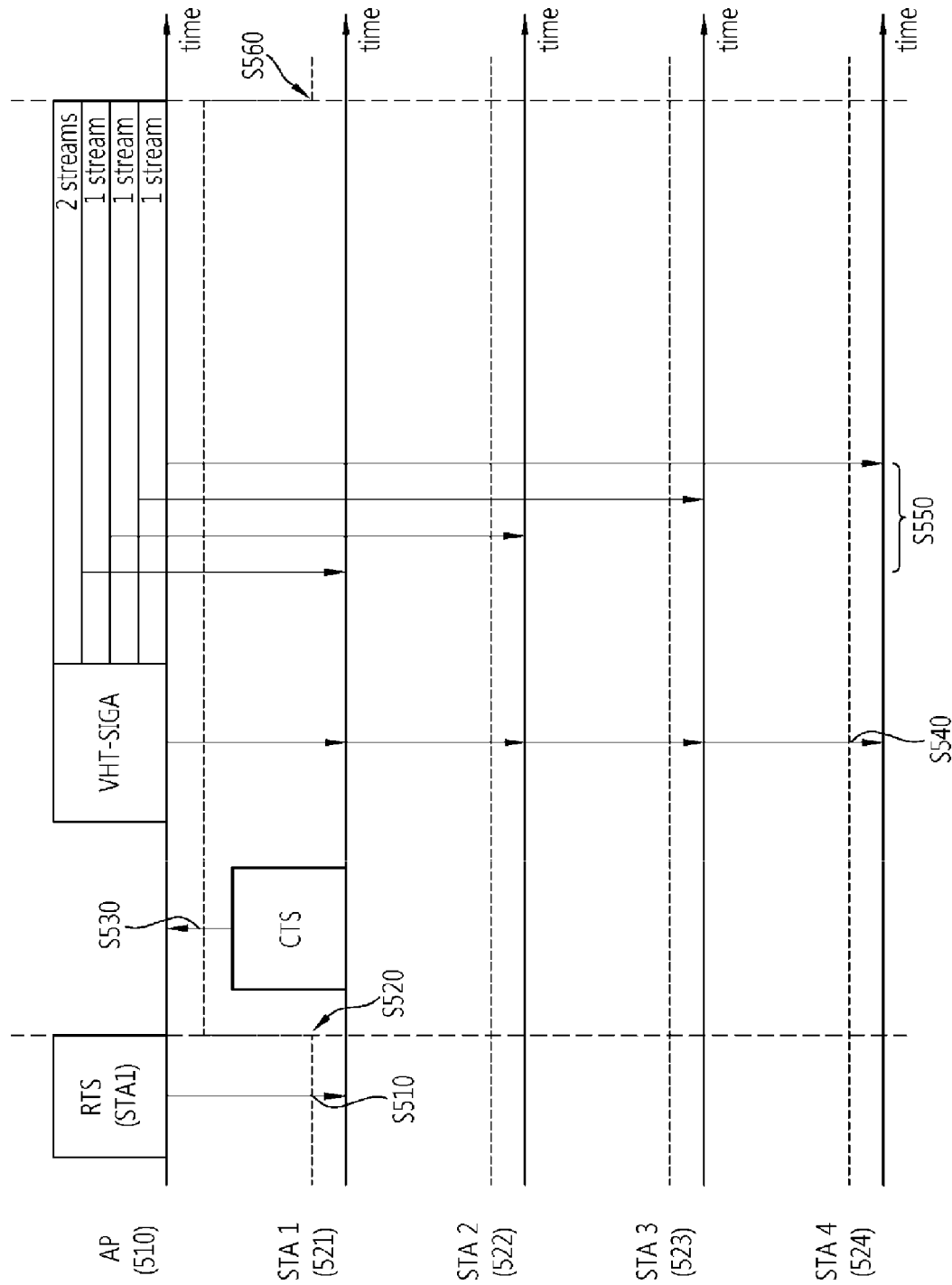
FIG. 5 shows an example of a communication method based on a receive chain control when fast receive chain activation is not supported according to an embodiment of the present invention.

FIG. 5 shows an example of a communication method based on a receive chain control when fast receive chain activation is not supported according to an embodiment of the present invention.

The communication method of FIG. 5 is more properly applied to a WLAN environment in which a case of receiving a PPDU by each STA through one spatial stream is expected to be more frequent than a case of receiving a PPDU by each STA simultaneously through several spatial streams in general MU-MIMO transmission.

Referring to FIG. 5, an AP 510 can instruct a specific STA to change a receive chain through an RTS/CTS sequence. Before the instruction is performed, the AP 510 needs to select an STA for changing the receive chain. The STA is an STA included in a transmission target STA group, and may be an STA operating in a dynamic SM power save mode.

If a plurality of STAs operate in the dynamic SM power save mode and are included in the transmission target STA group, the AP may select one STA by considering the number of spatial streams to be allocated to each STA to receive a PPDU and various quality of service (QoS) conditions such as latency. An STA for changing a receive chain to receive the PPDU through the aforementioned process can be called a primary user.

In order to allow a target STA to activate a receive chain, the AP 510 transmits an RTS frame to an STA1 521 which is a primary user (step S510). Upon receiving the RTS frame, the STA1 521 activates all receive chains (step S520). In response to the RTS, the STA1 521 transmits a CTS frame to the AP 510 (step S530). Although the RTS frame is received or overheard, an STA2 522, and STA3 523, and an STA4 524 retain a single receive chain operation since the RTS frame is not for the STA.

Thereafter, the AP 510 transmits a PPDU including a VHT-SIG field and other data fields to the STA1 521, the STA2 522, the STA3 523, and the STA4 524 according to a MU-MIMO transmission scheme.

The AP 510 transmits the VHT-SIGA field to the STAs 521, 522, 523, and 524 (step S540). The VHT-SIGA field is transmitted through one spatial stream.

Subsequently to the VHT-SIGA field, the AP 510 transmits a data field to the STAs 521, 522, 523, and 524 (step S550). The STA2 522, the STA3 523, and the STA4 524 are STAs operating as a single receive chain, and the AP 510 allocates one spatial stream to each STA. Therefore, data fields are transmitted to respective STAs through one spatial stream.

On the other hand, since the STA1 521 is an STA that operates by activating a plurality of receive chains, the AP 510 transmits a data field to the STA1 521 through a plurality of spatial streams. Information indicating the number of spatial streams used to transmit the data field to the STA1 521 can be included in a VHT-SIGA field. Although the number of spatial streams allocated to the STA1 521 is 2 in the drawing, this is for exemplary purposes only.

When transmission of the data field ends, the STA1 521 can operate as a single receive chain by deactivating some receive chains (step S560).

According to the communication method based on the receive chain control of FIG. 5, the number of spatial streams allocated to STAs can be limited to (N, 1, 1, 1) when MU-MIMO transmission is performed by the AP. In this case, N is the number of spatial streams allocated to a primary user, and is greater than or equal to 1 and is equal to a less than the maximum number of spatial streams located to one STA in a WLAN system.

According to the aforementioned communication method, a specific STA can be allowed to change a receive chain through an RTS/CTS sequence without having to modify a protocol or standard related to the conventional WLAN system. However, there may be restriction on the number of spatial streams that can be allocated to each STA.

Figure 6:
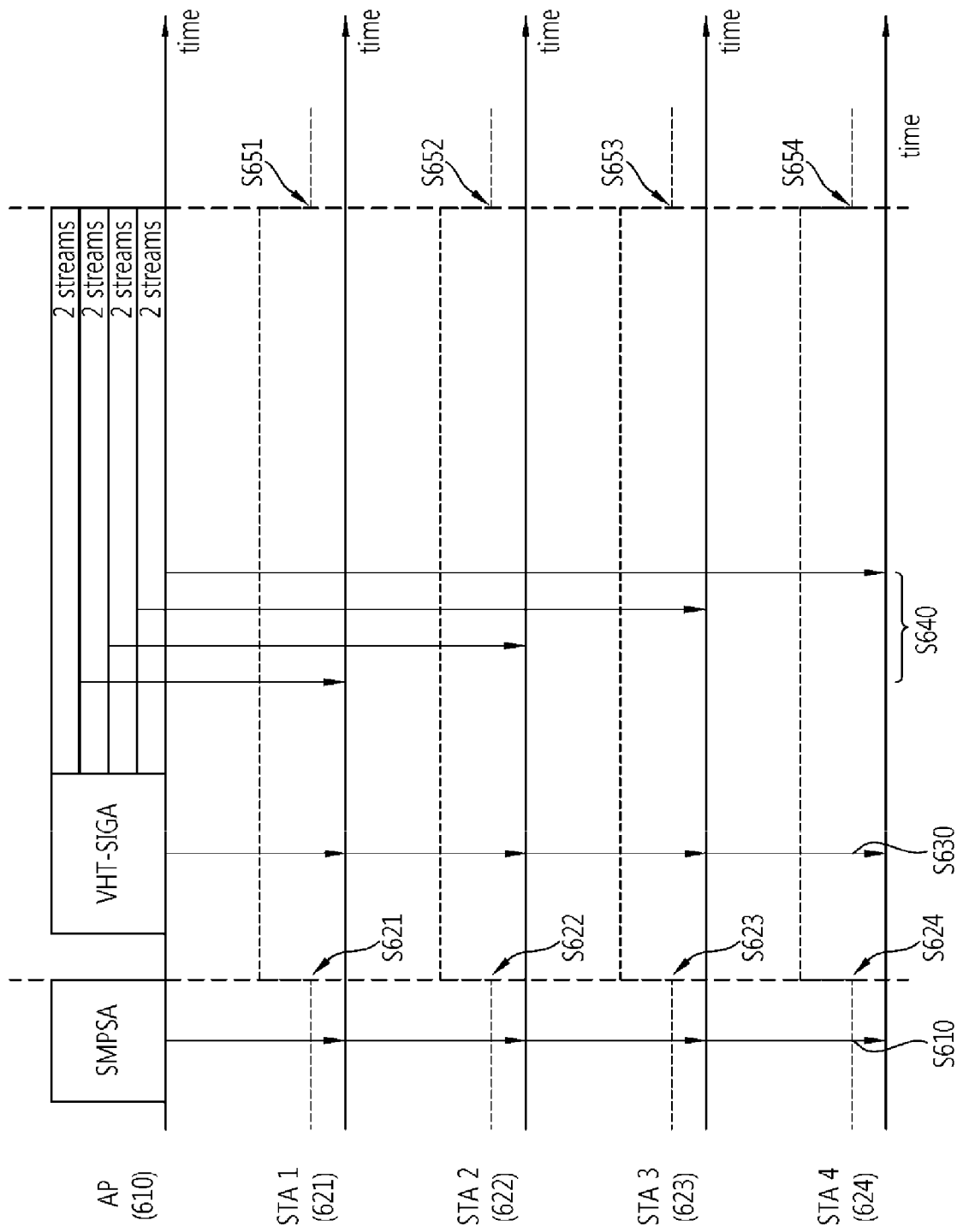
FIG. 6 shows another example of a communication method based on a receive chain control when fast receive chain activation is not supported according to an embodiment of the present invention.

FIG. 6 shows another example of a communication method based on a receive chain control when fast receive chain activation is not supported according to an embodiment of the present invention.

Referring to FIG. 6, an AP 610 can signal an STA1 621, an STA2 622, an STA3 623, and an STA4 624 to change a receive chain. For this, the AP 610 transmits a spatial multiplexing power save announcement (SMPSA) frame to the STAs 621, 622, 623, and 624 (step S610). The SMPSA frame may include information indicating activation of the receive chain. Alternatively, a protocol may be configured to activate the receive chain when a frame control field indicating that a corresponding frame is an SMPSA frame is included and the STAs receive the SMPSA frame. The SMPSA frame may further include a group ID and information indicating the number of spatial streams. The SMPSA frame may be transmitted to each of the STAs 621, 622, 623, and 624 or may be broadcast.

The STAs 621, 622, 623, and 624 activate a necessary receive chain on the basis of the group ID and the information indicating the number of spatial streams included in the SMPSA frame (steps S621, S622, S623, and S624).

The AP 610 transmits a VHT-SIGA field to the STAs 621, 622, 623, and 624 (step S630). The VHT-SIGA field is transmitted through one spatial stream.

Subsequently to the VHT-SIGA field, the AP 610 transmits a data field to the STAs 621, 622, 623, and 624 (step S640). Since all of the STAs 621, 622, 623, and 624 operate by using a plurality of receive chains, the STAs can receive a data field through a plurality of spatial streams. Although each STA receives the data field through two spatial streams in the present embodiment, the number of spatial streams is not limited thereto.

According to the communication method of FIG. 6, there is a need to propose a new frame format in order to signal a receive chain change of the STAs. In addition, transmission of the new frame may result in the increase of an overhead. On the other hand, unlike the case of FIG. 5, the AP 510 can freely change a receive chain operated by each STA, and thus the receive chain can be controlled easily in comparison with the case of FIG. 5.

Figure 7:
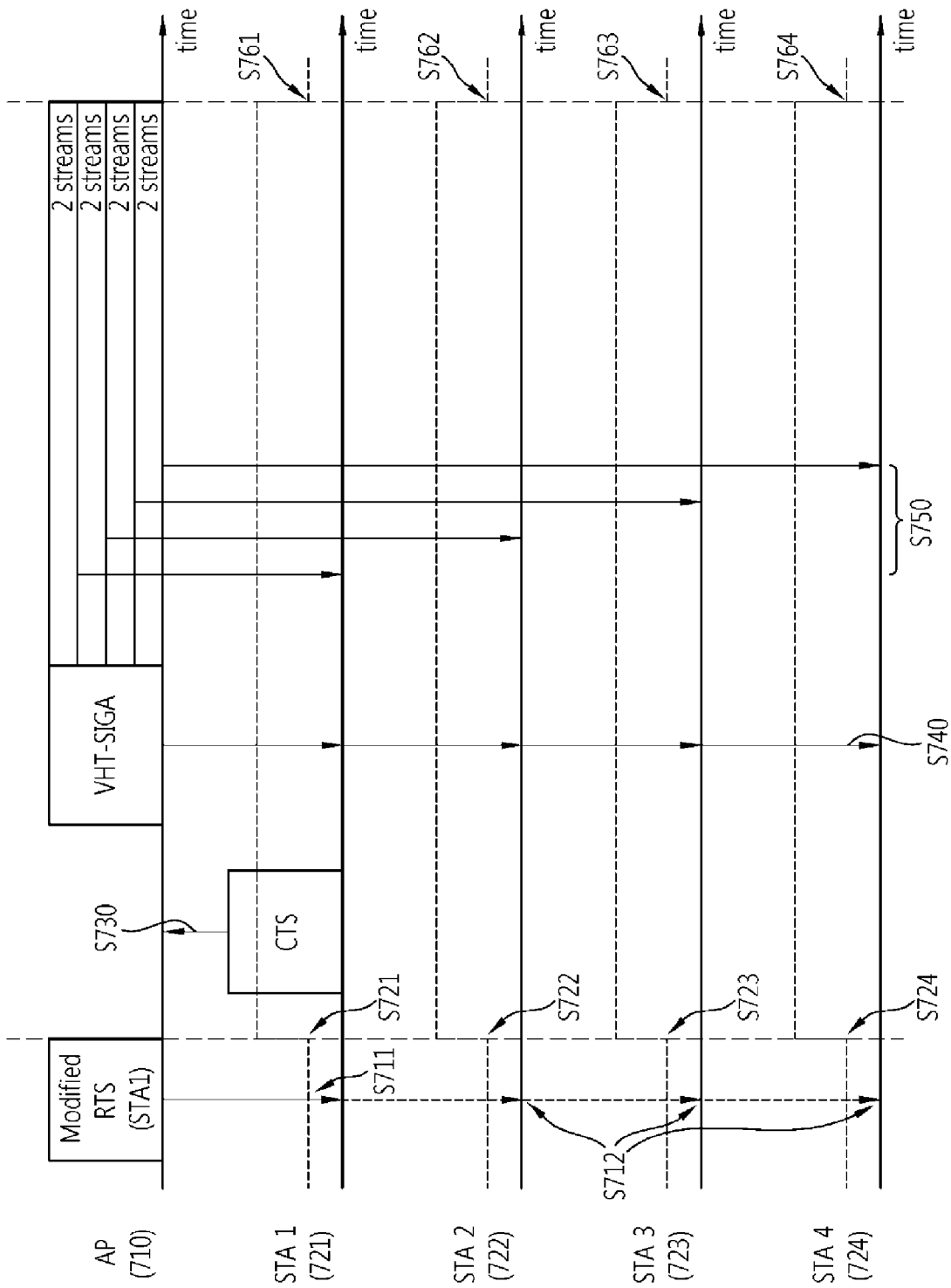
FIG. 7 shows another example of a communication method based on a receive chain control when fast receive chain activation is not supported according to an embodiment of the present invention.

FIG. 7 shows another example of a communication method based on a receive chain control when fast receive chain activation is not supported according to an embodiment of the present invention.

Referring to FIG. 7, an AP 710 transmits a modified RTS frame to an STA1 721 (step S711). The modified RTS frame includes a group ID and information indicating the number of spatial streams. The modified RTS frame can be transmitted by being included in a control wrapper frame. An STA2 722, an STA3 723, and an STA4 724 can acquire the group ID and the information indicating the number of spatial streams by receiving or overhearing the modified RTS frame which is unicast to the STA1 721 (step S712).

The STAs 721, 722, 723, and 724 activate a necessary receive chain on the basis of information included in the modified RTS frame, i.e., the group ID and the information indicating the number of spatial streams (steps S721, S722, S723, and S724). Optionally, the STAs can activate all receive chains.

The STA1 721 transmits a CTS frame to the AP 710 in response to the RTS frame (step S730).

The AP 710 transmits a VHT-SIGA field to the STAs 721, 722, 723, and 724 (step S740), and transmits a data field to the respective STAs through a plurality of spatial streams (step S750). Since the STAs 721, 722, 723, and 724 operate by using a plurality of receive chains, the STAs can receive the data field through a plurality of spatial streams.

The STAs 721, 722, 723, and 724 can operate as a single receive chain by deactivating some receive chains after reception of the data field ends (steps S761, S762, S763, and S764).

In the example of FIG. 7, legacy STAs which are not transmission target STAs can receive a part of the control wrapper frame, and can configure a network allocation vector (NAV) by decoding a duration/ID field.

In order to support the communication method of FIG. 7, there is a need to newly propose the modified RTS frame format. As a result, a size of the old RTS frame increases, which may lead to the increase of an overhead. However, in comparison with the conventional communication method based on the receive chain control through the RTS/CTS sequence, the AP can freely control the receive chain of the STAs and transmit a PPDU. Similarly to the modified RTS frame, the present example of the communication method can be implemented by using transmission of a group RTS frame to be transmitted to a plurality of STAs.

Figure 8:
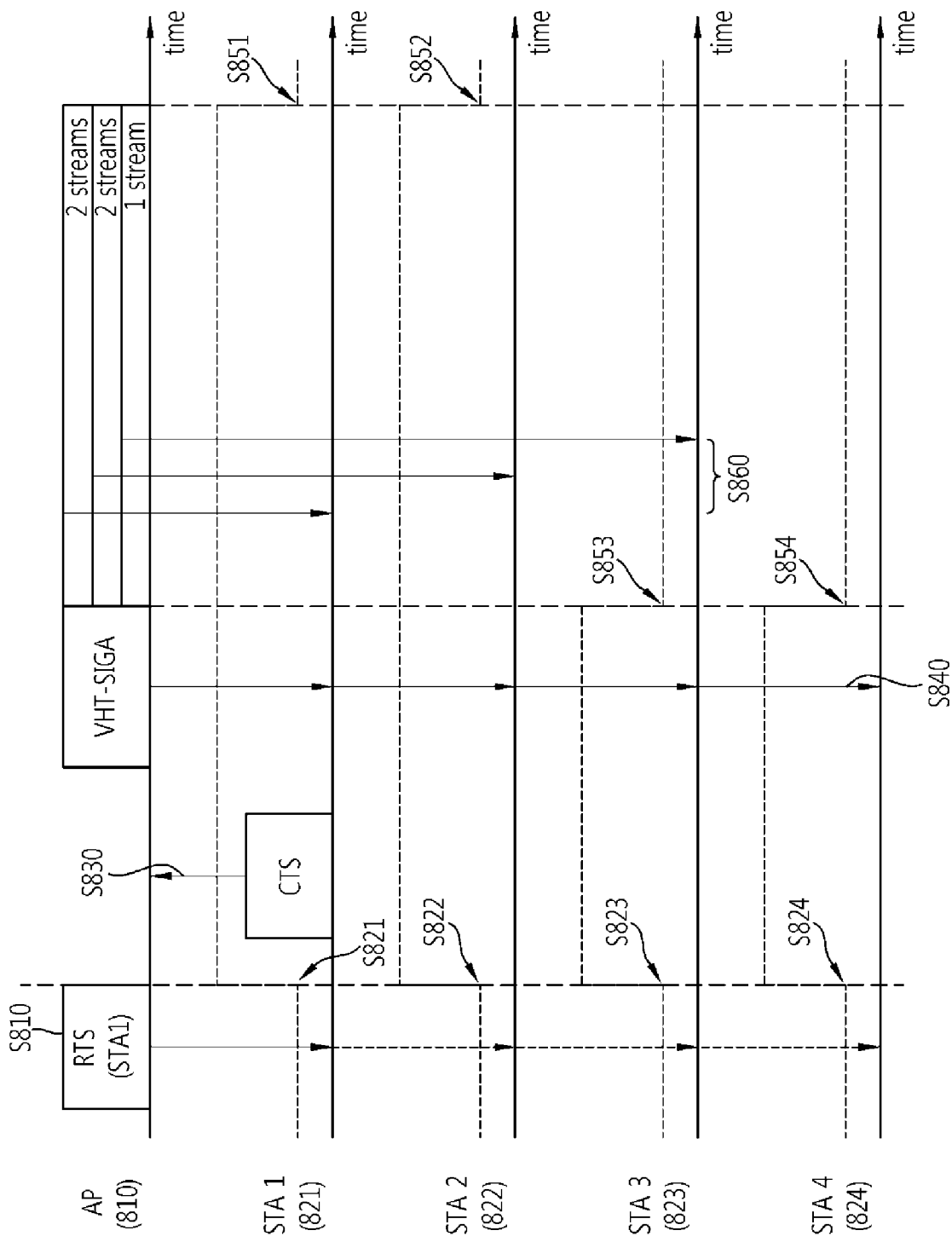
FIG. 8 shows another example of a communication method based on a receive chain control when fast receive chain activation is not supported according to an embodiment of the present invention.

FIG. 8 shows another example of a communication method based on a receive chain control when fast receive chain activation is not supported according to an embodiment of the present invention.

It is assumed in the present embodiment that STAs know a specific STA belonging to each STA group. As described above, the STA can know a group ID indicating a transmission target STA group to which the STA is registered by receiving a group ID management frame. However, the STA cannot know whether another STA is registered to the specific STA group by using only information included in the group ID management frame transmitted to the STA. However, by overhearing a group ID management frame to be transmitted by STAs to other STAs, specific STAs included in each STA group can be known.

Referring to FIG. 8, an AP 810 transmits an RTS frame (step S810). Since an STA1 821 is a target of an RTS frame, the STA1 821 can change a receive chain upon receiving of the RTS frame (step S821).

When the RTS frame is received or overheard, an STA2 822, an STA3 823, and an STA4 824 confirm whether they are included in the same transmission target STA group as that of the STA1 821 which is a target STA of the RTS frame, and if they are included in the same transmission target STA group, can change a receive chain (steps S822, S823, and S824). The STA1 821 may be registered to several transmission target STA groups. Therefore, some of STAs which have changed the receive chain may change the receive chain even though they are not included in a transmission target STA group of a PPDU which is actually transmitted using MU-MIMO by the AP 810.

The STA1 821 transmits a CTS frame to the AP 810 in response to the RTS frame (step S830).

The AP 810 transmits a VHT-SIGA field (step S830). The STA1 821, the STA2 822, and the STA3 823 are STAs included in the transmission target STA group, and the STA4 824 is an STA not included in the transmission target STA group. The STA4 824 confirms that it is not included in the transmission target STA group on the basis of a group ID of the VHT-SIGA field, and can operate as a single receive chain by deactivating receive chains among a plurality of activated receive chains (step S854).

Two spatial streams are allocated to each of the STA1 821 and the STA2 822, whereas one spatial stream is allocated to the STA3 823. Therefore, the STA3 823 can operate as a single receive chain by deactivating some receive chains (step S853).

The AP 810 transmits a data field to the transmission target STA group (step S840). The data field can be transmitted to the STA1 821 and the STA2 822 through two spatial streams, and can be transmitted to the STA3 823 through one spatial stream.

The STA1 821 and the STA2 822 can operate as a signal receive chain by deactivating some receive chains after reception of the data field ends (steps S851 and S852).

According to the communication method of FIG. 8, each STA must be able to overhear a group ID management frame for another STA, and thus it may be need to modify a protocol related to allocation of a group ID. STAs activate a necessary receive chain if the STAs are included in the same STA group as that of a target STA of RTS irrespective of whether the STAs are included in the transmission target STA group. Therefore, since an unnecessary operation of changing the receive chain is performed, unnecessary power consumption may be generated. However, a plurality of STAs can be allowed to support an operation based on a dynamic SM power save through the existing RTS/CTS sequence.

Meanwhile, a communication method based on a receive chain control through the existing RTS/CTS sequence can be proposed.

Since the RTS frame is also transmitted by being converted into a PPDU format, a scrambling sequence is transmitted together when transmitting the RTS frame. The scrambling sequence can be originally configured by Table 2 below.

TABLE 2

| INDICATED_CH_BANDWIDTH | INDICATED_DYN_BANDWIDTH | First 7 bits of Scrambling Sequence | | |
|---|---|---|---|---|
| Not present | — | Unused | | |
| Present | Not present | 5 bit pseudo-random nonzero integer | 00(NON_HT_CBW20) 01(NON_HT_CBW40) 10(NON_HT_CBW80) 11(NON_HT_CBW160) | |
| Present | Present | 4 bit pseudo-random nonzero integer | 0(Static) 1(Dynamic) | |
| | | B0   B3 | B4   B5 | B6 |

It is possible to implement such that MU-MIMO transmission is indicated by using B0 to B3 in the above scrambling sequence. For example, it is possible to implement such that MU-MIMO transmission is indicated if one bit out of 4 bits of B0 to B3 is set to 1, and otherwise MU-MIMO transmission is not indicated. As such, the communication method in which MU-MIMO is indicated by using a specific bit of the scrambling sequence when transmitting an RTS frame will be described in detail with reference to FIG. 9.

Figure 9:
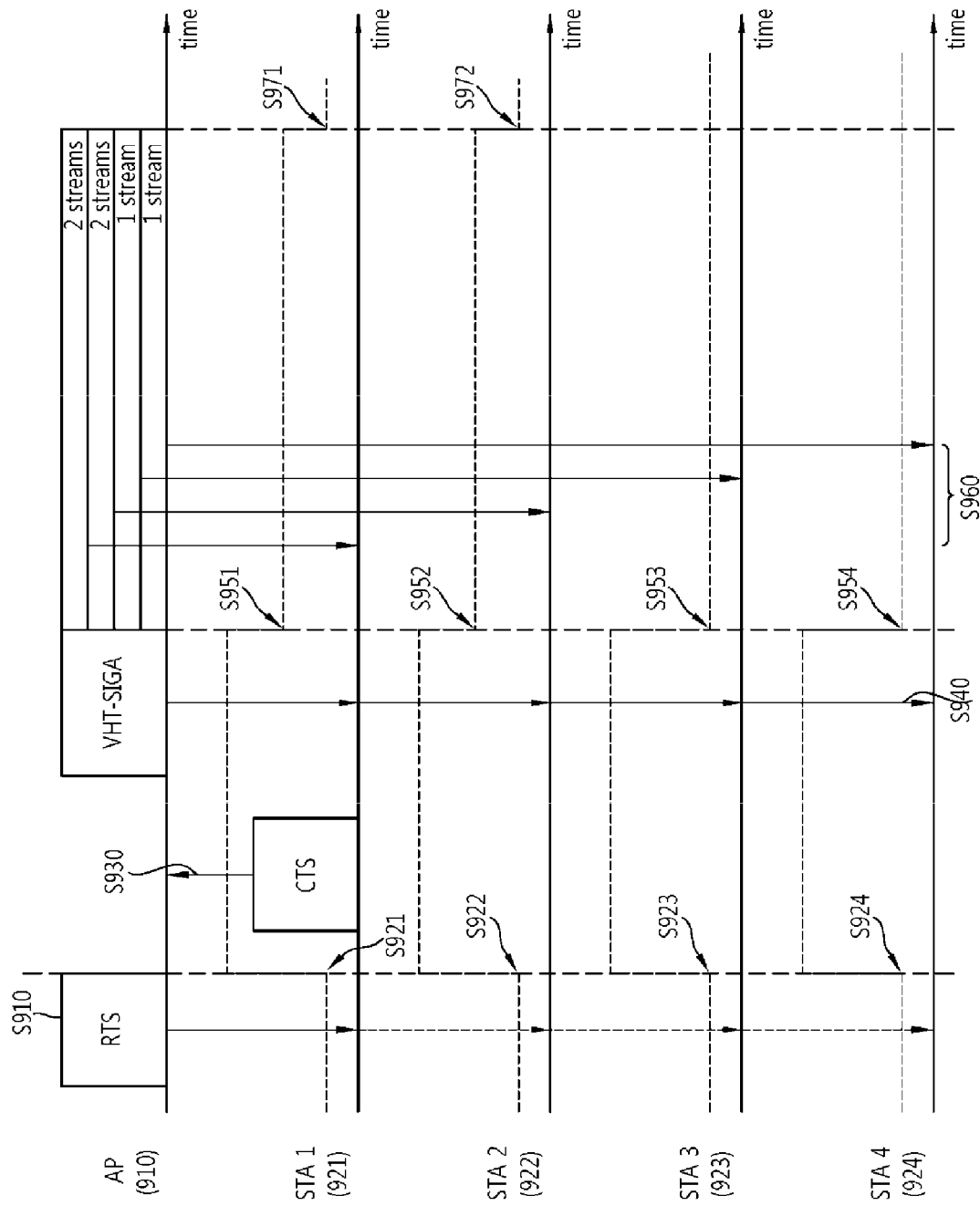
FIG. 9 shows an example of a communication method based on a receive chain control by using an RTS/CTS sequence according to an embodiment of the present invention.

FIG. 9 shows an example of a communication method based on a receive chain control by using an RTS/CTS sequence according to an embodiment of the present invention.

Referring to FIG. 9, an AP 910 transmits an RTS frame (step S910). STAs 921, 922, 923, and 924 may activate all receive chains if MU-MIMO transmission of a scrambling sequence is indicated while receiving the RTS frame (steps S921, S922, S923, and S924).

The STA1 921 transmits a CTS frame to the AP 910 in response to the RTS frame (step S930).

The STAs 921, 922, 923, and 924 receive a VHT-SIGA field transmitted by the AP 910 (step S940). The STAs 921, 922, 923, and 924 confirm whether they are included in a transmission target STA group on the basis of a group ID and confirm the number of spatial streams allocated to the STAs on the basis of information indicating the number of spatial streams. It is assumed in the present embodiment that the STA1 to the STA4 921, 922, 923, and 924 are included in a transmission target STA group indicated by the group ID. An STA which is not included in the transmission target STA group operates as a single receive chain by deactivating receive chains.

It is assumed that two spatial streams are allocated to the STA1 921 and the STA2 922, and one spatial stream is allocated to the STA3 923 and the STA4 924. Since a plurality of spatial streams are allocated to the STA1 921 and the STA2 922, the remaining receive chains except for a receive chain required to allocation of the spatial streams are deactivated (steps S951 and S952). Since one spatial stream is allocated to the STA3 923 and the STA4 924, the remaining receive chains except for one receive chain are deactivated (steps S953 and S954).

The AP 910 transmits a data field to the STAs 921, 922, 923, and 924 (step S940). The STA1 921 and the STA2 922 receive a data field through two spatial streams, and the STA3 923 and the STA4 924 receive a data field through one spatial stream.

The STA1 921 and the STA2 922 can operate as a single receive chain by deactivating some receive chains after receiving the data field (steps S971 and S972).

The AP can indicate that MU-MIMO transmission will be performed to the transmission target STAs so that the STAs are allocated to activate the receive chain, which can be implemented by transmitting a null data packet announcement (NDPA) frame.

Figure 10:
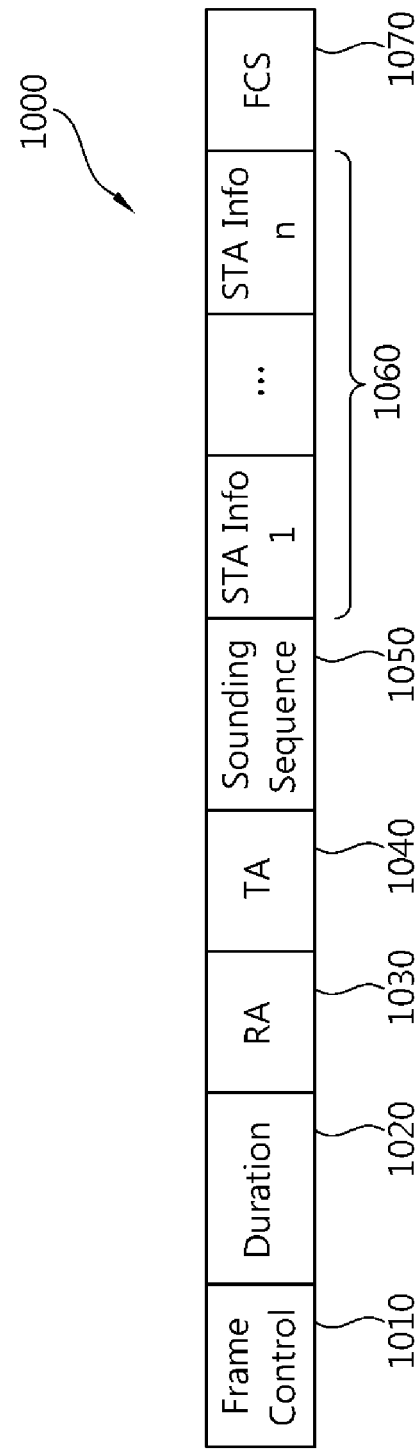
FIG. 10 shows an NDPA frame structure according to an embodiment of the present invention.

FIG. 10 shows an NDPA frame structure according to an embodiment of the present invention.

Referring to FIG. 10, an NDPA frame 1000 includes a frame control field 1010, a duration field 1020, a receiver address (RA) field 1030, a transmitter address (TA) field 1040, a sounding sequence field 1050, at least one or more STA information (STA info) fields 1060, and an FCS field 1070.

The frame control field 1010, the duration field 1020, the RA field 1030, and the TA field 1040 can be set to the same as those of the NDPA frame for the existing channel sounding. The frame control field 1010 includes information necessary for indicating that a corresponding frame is an NDPA frame and for interpretation of the NDPA frame. The duration field 1020 includes information indicating a length of the NDPA frame 1000. The RA field 1030 includes address information indicating broadcast. The TA field 1040 includes information indicating an address of an AP and/or an STA for transmitting the NDPA frame.

The sounding sequence field 1050 can be set to a specific value among values that can be used as a sounding sequence. When setting this field to the specific value, it can be implemented such that the NDPA frame 1000 is transmitted in order to indicate the number of spatial streams that can be allocated to the STA with respect to a PPDU to be transmitted immediately after transmission of the NDPA frame 1000.

Figure 11:
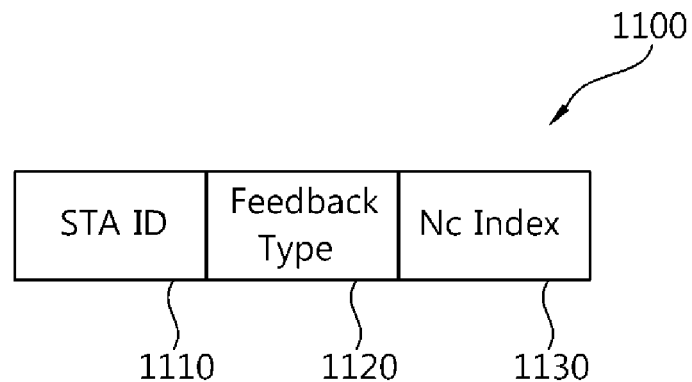
FIG. 11 shows a format of an STA information field according to an embodiment of the present invention.

Each STA information field can refer to FIG. 11.

FIG. 11 shows a format of an STA information field according to an embodiment of the present invention.

Referring to FIG. 11, an STA info field 1100 includes an STA ID sub-field 1110, a feedback type sub-field 1120, and an Nc index sub-field 1130.

The STA ID sub-field 1110 can be set to an association ID (AID) of a target STA for which the STA info field 1100 is valid.

The feedback type sub-field 1120 can be configured as a reserved sub-field.

The Nc index sub-field 1130 can be set to a value indicating the number of spatial streams allocated to a corresponding STA.

When the NDPA frame transmission of FIG. 10 ends, a PPDU based on MU-MIMO transmission can be performed after a short interframe space (SIFS) elapses.

Upon receiving an NDPA frame in which the sounding sequence field 1050 is set to 0, STAs confirm an STA ID sub-field included in the STA info field and thus confirm whether the STAs belong to transmission target STAs. If the STAs belong to the transmission target STAs, a receive chain is activated by assuming that spatial streams are allocated by a value indicated by the Nc index sub-field. If the STAs do not belong to the transmission target STAs, the STAs operate while retaining the existing single receive chain.

Thereafter, each STA receives a PPDU transmitted according to MU-MIMO. In this case, the STAs can operate by changing the receive chain again according to the group ID of the VHT-SIGA field included in the PPDU and the information indicating the spatial streams.

Meanwhile, regarding an STA supporting fast receive chain activation, a channel sounding method not using an NDPA frame can be proposed. The NDPA frame is a frame for announcing transmission of a null data packet (NDP) and for announcing the start of NDP-based channel sounding. The NDP has a format in which the data field is excluded in the PPDU format of FIG. 3, and thus cannot indicate a MAC address of a target STA. Therefore, the NDPA frame is used.

The NDPA may include a list of STAs which will join channel sounding and information indicating an STA to which a channel estimation result is fed back for the first time. In this case, the STA to which the channel estimation result is fed back for the first time may be an STA related to an STA information field included in a first portion of the NDPA frame format of FIG. 10.

Figure 12:
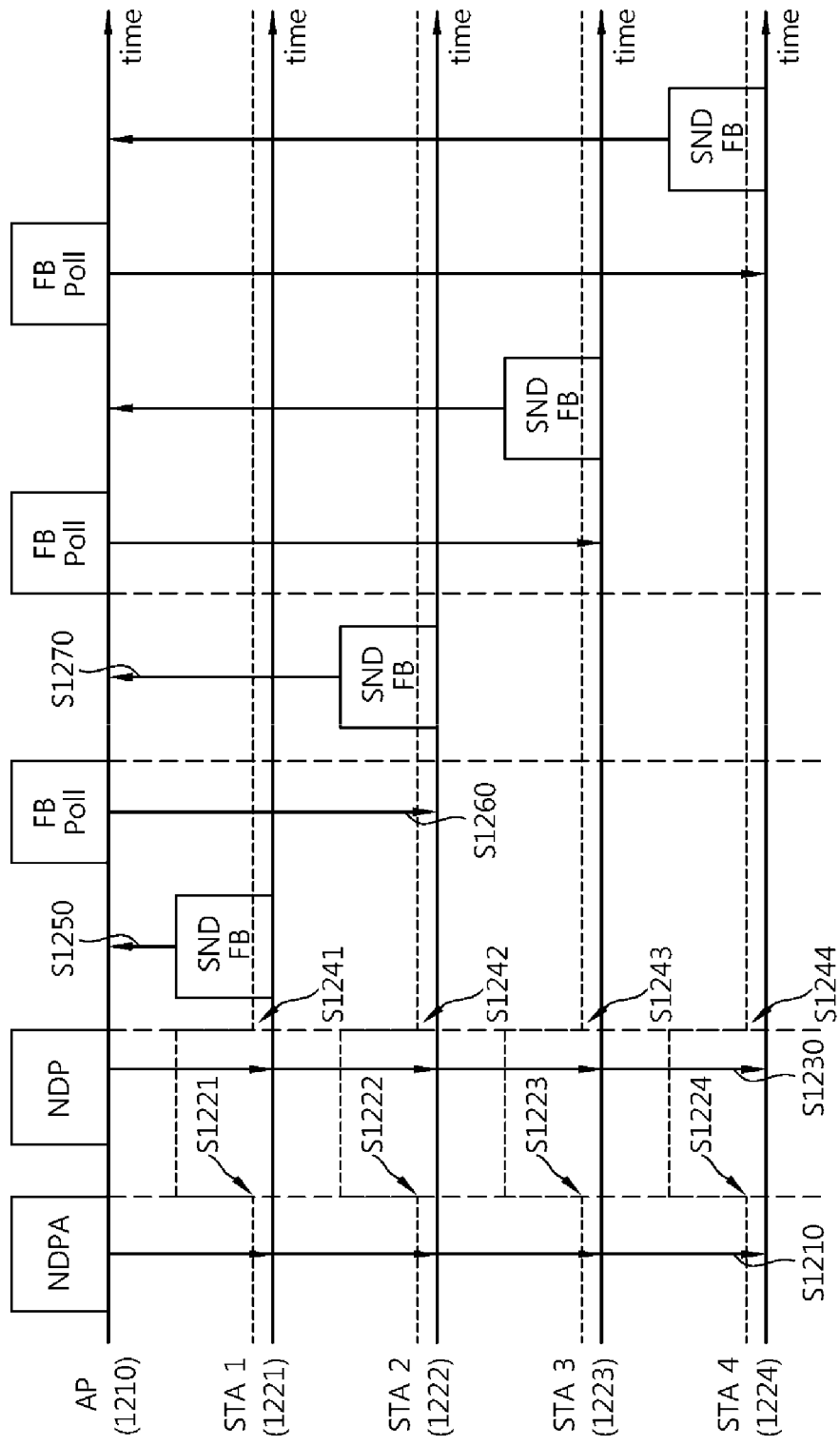
FIG. 12 shows a channel sounding method.

FIG. 12 shows a channel sounding method.

Referring to FIG. 12, an AP 1210 transmits an NDPA frame including an STA information field with respect to STAs which intend to join channel sounding (step S1210). It is assumed that the NDPA frame first includes a channel information field for an STA1 1221.

Upon receiving the NDPA frame and determining that the STAs are target STAs that will join channel sounding, the STAs 1221, 1222, 1223, and 1224 activate a plurality of receive chains (steps S1221, S1222, S1223, and S1224).

The AP 1210 transmits an NDP (step S1230). The NDP includes a training sequence which is used as a basis when the STAs 1221, 1222, 1223, and 1224 perform channel estimation. Upon receiving the NDP, the STAs 1221, 1222, 1223, and 1224 can deactivate some receive chains to re-operate as a single receive chain.

The STA1 1221 performs channel estimation based on the NDP and transmits a sounding feedback (SND FB) frame including channel state information (CSI) to the AP 1210 (step S1250).

Thereafter, a sounding feedback procedure is performed by polling of the AP 1210. The AP 1210 transmits a feedback poll frame to the STA2 (step S1260). The STA2 1220 transmits a sounding feedback frame including the CSI to the AP 1210 (step S1270). Thereafter, sounding feedback of the STA3 1222 and the STA4 1224 is performed by polling.

Meanwhile, when MU-MIMO transmission is supported, the AP can transmit the VHT-SIGA field to inform to the STAs a specific STA to which the PPDU is transmitted. Therefore, channel sounding may be possible only with the NDP without transmission of the NDPA frame.

Figure 13:
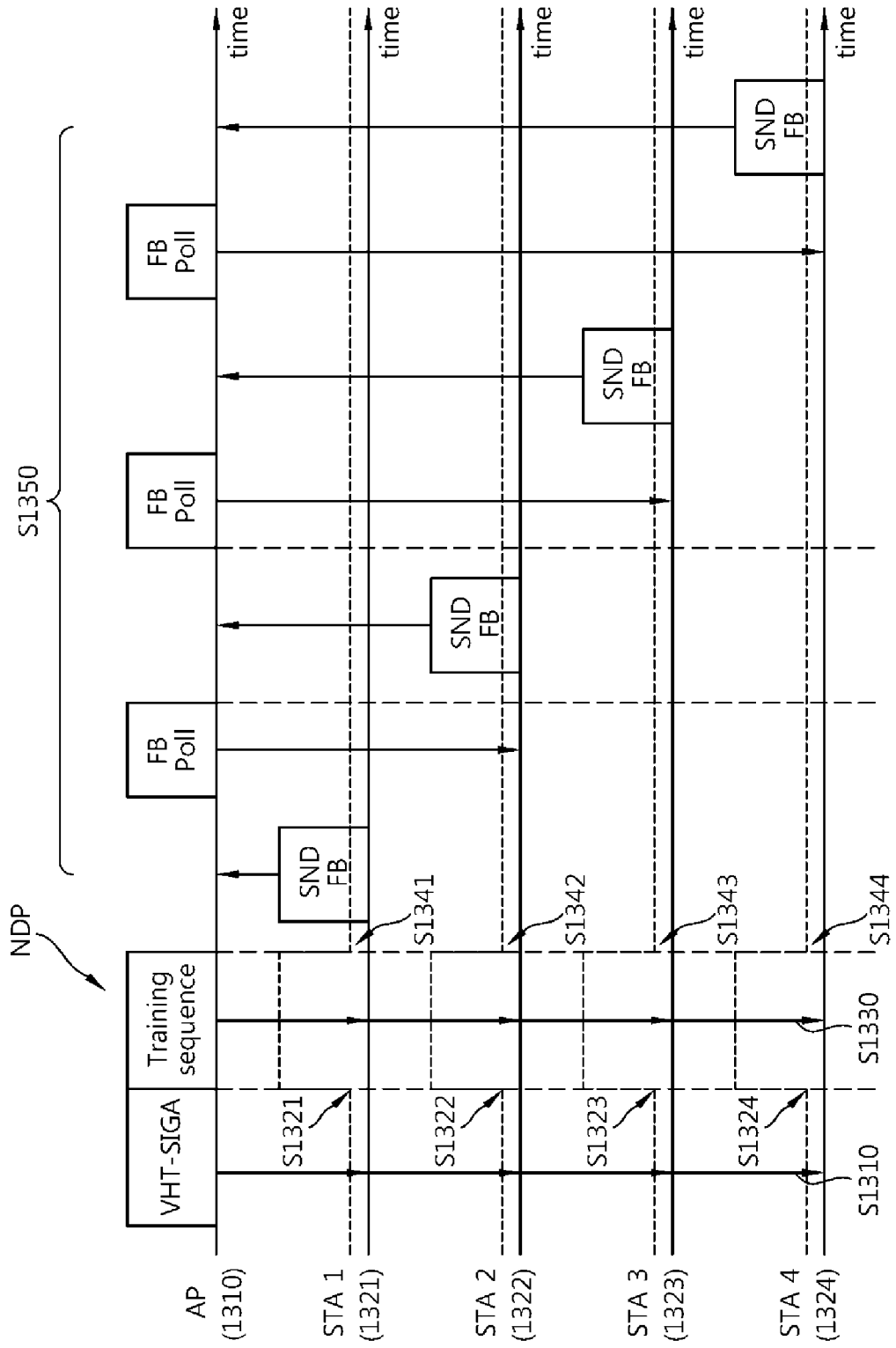
FIG. 13 shows a channel sounding method according to an embodiment of the present invention.

FIG. 13 shows a channel sounding method according to an embodiment of the present invention.

Referring to FIG. 13, an AP 1310 transmits a VHT-SIGA field to STAs 1321, 1322, 1323, and 1324 (step S1310). A reservation bit field constituting the VHT-SIGA field can be configured to indicate that channel sounding will start and subsequently an NDP will be transmitted. Alternatively, by setting information indicating the number of spatial streams such that the number of spatial streams allocated to each STA is 7, it can be indicated that channel sounding will start and the NDP will be transmitted. Since a group ID is included in the VHT-SIGA field, the STA can determine whether the STA is a sounding target STA.

The STAs 1321, 1322, 1323, and 1324 which are sounding target STAs receive the VHT-SIGA field and thereafter activate receive chains (steps S1341, S1342, S1343, and S1344).

The AP 1310 transmits a training sequence to the STAs 1321, 1322, 1323, and 1324 (step S1330). The training sequence can include VHT-STF and VHT-LTF of the NDP. The STAs 1321, 1322, 1323, and 1324 can receive the training sequence and thereafter can operate as a single receive chain by deactivating receive chains.

Thereafter, the STAs 1321, 1322, 1323, and 1324 feed back CSI to the AP 1310 (step S1350).

The aforementioned various embodiments of the present invention described with reference to the drawings can be separately implemented or can be implemented as one communication method by combining technical features.

Figure 14:
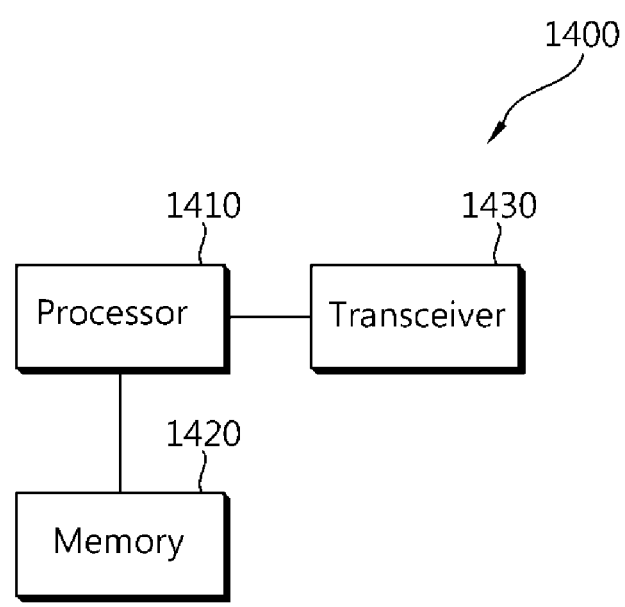
FIG. 14 is a block diagram showing a wireless apparatus to which an embodiment of the present invention is applicable.

FIG. 14 is a block diagram showing a wireless apparatus to which an embodiment of the present invention is applicable. The wireless apparatus may be an AP or an STA.

Referring to FIG. 14, a wireless apparatus 1400 includes a processor 1410, a memory 1420, and a transceiver 1430. The transceiver 1430 transmits and/or receives a radio signal, and implements an IEEE 802.11 PHY layer. The processor 1410 is operationally coupled to the transceiver 1430, and implements IEEE 802.11 MAC and PHY layers. The processor 1410 can be configured to generate a PPDU format proposed in the present invention and to transmit the PPDU format. Further, the processor 1410 can be configured to acquire control information by receiving the transmitted PPDU and interpreting a field value included in the PPDU and to acquire data by using the control information. The processor 1410 can be configured to implement the aforementioned embodiment of the present invention described with reference to FIG. 4 to FIG. 13.

The processor 1410 and/or the transceiver 1430 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1420 and may be performed by the processor 1410. The memory 1420 may be located inside or outside the processor 1410, and may be coupled to the processor 1410 by using various well-known means.

The invention claimed is:

1. A method of communication based on a receive chain control in a wireless local area network, the method comprising:

receiving, by a receiver in a spatial multiplexing (SM) power save mode, a frame from a transmitter based on a single active receive chain for one spatial stream, the frame including a signal field related to a multi receive chain operation, activating, by the receiver, a plurality of receive chains including the single active receive chain based on the signal field when the signal field indicates an activation of the plurality of receive chains of the receiver, each of the plurality of receive chains processing a received signal transmitted through each of a plurality of spatial streams, and receiving, by the receiver, a plurality of data field transmitted after the signal field in the frame from the transmitter through at least one activated receive chain of the plurality of receive chains, wherein the SM power save mode saves power of the receiver by activating or deactivating at least one receiver chain among a maximum number of receiver chains of the receiver, wherein the signal field includes receiver group information and receiving chain number information, wherein the receiver group information includes information related to an identifier of the receiver and another identifier of another receiver receiving the frame, and wherein the receiving chain number information includes information related to a number of receive chains of the receiver to be activated to receive the plurality of data field and a number of receive chains of another receiver to be activated to receive a plurality of another data field.

2. An wireless apparatus comprising:

a transceiver configured to transmit or receive a radio signal; and, a processor operatively coupled to the transceiver and configured to:

receive, while in a spatial multiplexing (SM) power save mode, a frame from a transmitter based on a single active receive chain for one spatial stream, the frame including a signal field related to a multi receive chain operation, activate a plurality of receive chains including the single active receive chain based on signal field when the signal field indicates an activation of the plurality of receive chains of the receiver, each of the plurality of receive chains processing a received signal transmitted through each of a plurality of spatial streams, and receive a plurality of data field transmitted after the signal field in the frame from the transmitter through the plurality of receive chains, wherein the SM power save mode saves power of the receiver by activating or deactivating at least one receiver chain among a maximum number of receiver chains of the receiver, wherein the signal field includes receiver group information and receiving chain number information, wherein the receiver group information includes information related to an identifier of the receiver and another identifier of another receiver receiving the frame, and wherein the receiving chain number information includes information related to a number of receive chains of the receiver to be activated to receive the plurality of data field and a number of receive chains of another receiver to be activated to receive a plurality of another data field.

3. The method of claim 1, further comprising:

deactivating, by the receiver, the plurality of receive chains except on the single active receive chain after the receiving the frame.

4. The method of claim 1, wherein the receiver activates the plurality of receive chains based on the signal field when the receiver operates in a fast receiver chain change mode, wherein an indication of an activation of the fast receiver chain change mode is transmitted by the transmitter when the receiver associates with the transmitter.

5. The wireless apparatus of claim 2, wherein the processor is further configured to deactivate the plurality of receive chains except on the single active receive chain after the receiving the frame.

6. The wireless apparatus of claim 2, wherein the receiver activates the plurality of receive chains based on the signal field when the receiver operates in a fast receiver chain change mode.

* * * * *